United States Patent Office 3,567,402
Patented Mar. 2, 1971

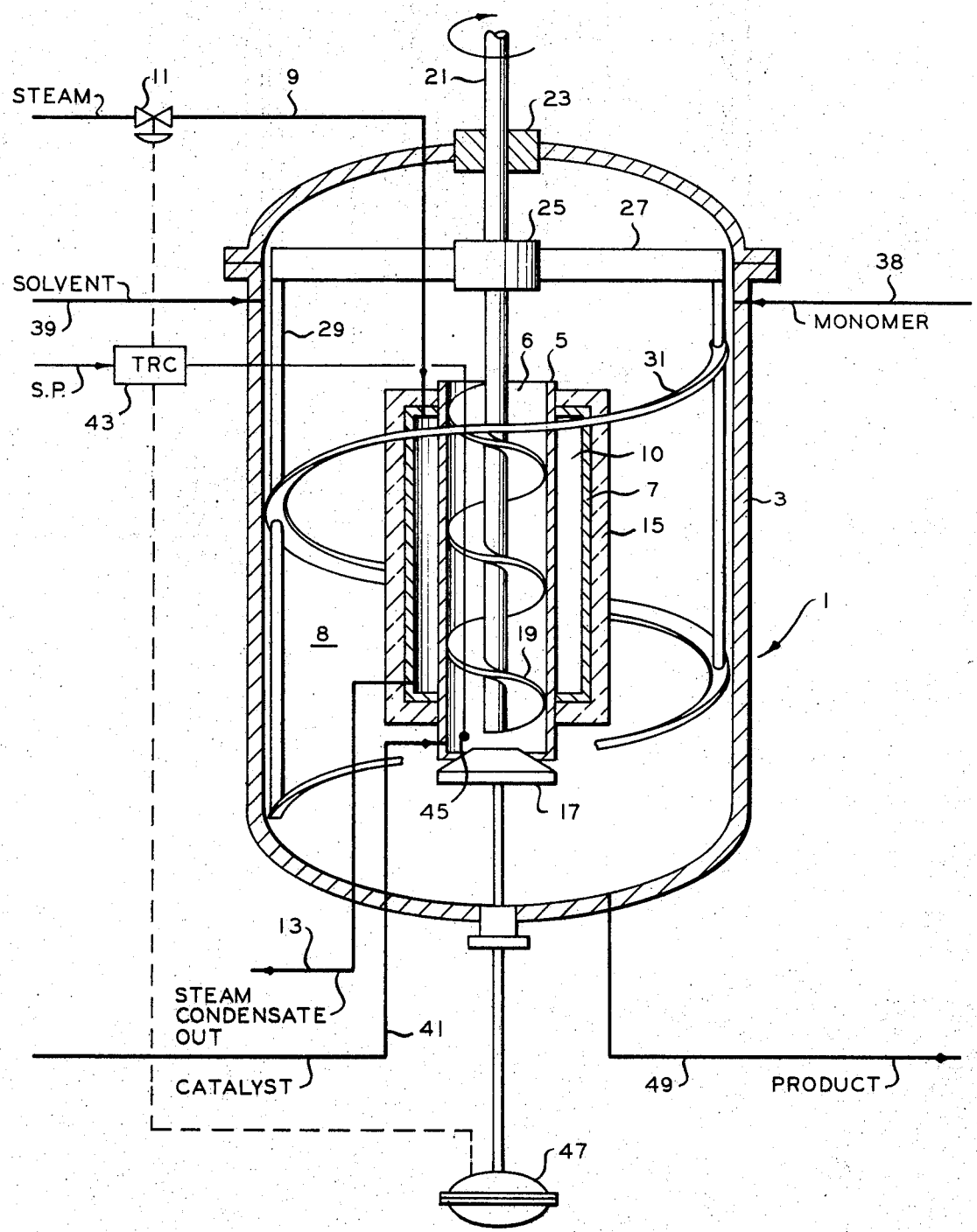

3,567,402
REACTOR WITH AXIALLY DISPOSED HEATED TUBE WITH VALVE
Don C. Christensen, Bartlesville, Okla., assignor to Phillips Petroleum Company
Original application Nov. 2, 1964, Ser. No. 408,184, now Patent No. 3,438,952, dated Apr. 15, 1969. Divided and this application Jan. 17, 1969, Ser. No. 792,080
Int. Cl. C08f 1/98
U.S. Cl. 23—285     3 Claims

ABSTRACT OF THE DISCLOSURE

An adiabatic reactor has axially positioned therein a vertical jacketed tube provided with an auger to circulate material through the tube, said tube having a valve means at the bottom thereof to restrict circulation. Temperature within the jacketed tube is sensed and signal generated thereby utilized to control heat to said jacket and to open said valve.

---

This is a division of my copending application Ser. No. 408,184, filed Nov. 2, 1964, now U.S. 3,438,952.

The present invention relates to polymerization reactors. In one aspect the invention relates to batch reactors designed to facilitate batch polymerizations carried on in viscous reaction media in an adiabatic system. In another aspect the invention relates to a batch reaction vessel which provides excellent mixing and temperature control of polymerizing masses during the manufacture of polymers therein. In yet another aspect, this invention relates to a batch solution polymerization and copolymerization of olefin monomers in which heat is not intentionally removed from the system by venting, cooling or the like.

The success of a given polymerization process is generally measured by the properties, or qualities, and more specifically the uniformity of properties exhibited by the resulting polymer product and by the quantity of polymerized product produced from a given amount of starting monomeric material. Considerable difficulty has been encountered in the carrying out of solution polymerization of olefin monomers on a commercial scale because of the problems in controlling the temperature within the batch reactor. The polymerization reaction is exothermic and it is, therefore, necessary to effect continuous withdrawal of heat from the reacting zone. However, this is complicated by the fact that in many cases the polymers produced remain in solution in the solvent. These viscous solutions of polymers constitute very poor heat transfer media. It is possible to improve the heat transfer by effecting continuous agitation so as to keep the body of the reaction mixture continuously in motion. However, experience has shown that even the best types of agitators will fail to produce the desired results. Since the viscosity of the reaction mixture is a function of the concentration of the polymer therein, one method of overcoming the heat transfer problems referred to above is to operate with a low concentration of polymer in the reaction mixture. This is an undesirable expedient since, if the polymer concentration is reduced, the output of polymer for a given size reaction system is reduced by a corresponding amount. Such reduced output has had to be tolerated in the past because no method for carrying out batch solution polymerization processes of olefin monomers has been capable of effecting the necessary withdrawal or utilization of reaction heat when operating with very viscous solutions of high polymer content. This is particularly true in the case of some polymers where the properties of the polymer obtained are considerably impaired if the temperature in the reaction zone is allowed to rise to too high a value.

In devising a batch process for exothermic polymerizations, and conjunctively the apparauts to be used in the same, two aspects prominently affect success. The first is the ability to extract and/or utilize heat generated by the reaction and the second is the capacity to provide contact between the reactants. Both must be provided for; otherwise, the resulting polymerized products possess non-uniform properties and low monomer conversion values may be experienced.

In accordance with the present invention, I have discovered that excellent synthetic rubber polymers can be obtained in the solution polymerization of the olefin monomer in the presence of a suitable catalyst, if polymerization is first initiated on a small fraction of the total volume of the reactant solution and this small fraction is permitted to circulate through the bulk of the reaction mixture where the heat of reaction of the initiated volume is used to initiate the remaining bulk. This adiabatic heating of the bulk of the reactants by the small volume which is preinitiated permits the initial reaction temperature of the polymerizing mixture to be lower than obtainable by prior art procedures and consequently to exhibit a lower final peak temperature. Ordinarily the polymerization must be initiated at a temperature between 140–180° F.; however, with my procedure, the reaction can be initiated as low as 50° F.

Accordingly, it is an object of the present invention to provide reactant apparatus in which to carry on batch adiabatic polymerization reactions in solutions which achieve high concentrations of polymer.

A further object is to provide batch polymerization reactors which provide excellent mixing and temperature control of polymerizing masses during the manufacture of polymers.

A still further object is to provide batch polymerization reactors which permit lower average initiation temperatures for the polymerizing masses.

Another object is to provide polymerization reactors in which the concentrations of both the solvent and the catalyst can be appreciably reduced without causing degradation of properties exhibited by the resulting polymer product.

Yet another object of the present invention is to provide a process for effecting solution polymerization of olefin monomers which is capable of operating terminally with high concentrations of polymers wherein the heat of reaction released in this exothermic polymerization and absorbed by the system still maintains the final temperature below a predetermined peak temperature.

Other objects and many of the attendant advantages of this invention will be readily appreciated as the same becomes better understood by reference to the following detailed description which is to be considered in connection with the accompanying drawing, in which:

In the drawing there is shown a partial cross sectional view of apparatus for carrying out the method of the invention.

Referring to the drawing, wherein a reactor 1, of the type presently preferred is illustrated:

Reactor 1 comprises a short vertically-designed cylindrical casing 3 of rigid construction. Within the reactor 1 there is suitably mounted a hollow draft tube 5 having a circular cross section, and being surrounded by a heating jacket 7 forming an annulus 10 through which steam from line 9, being regulated by control valve 11 (as hereinafter described), is circulated and its condensate exhausted through line 13. This jacketed tube 5 forms a confined mixing zone located within the reactor. The diameter and length of tube 5 is constructed to enclose a volume which is from 2 to 10 percent, preferably about 5 percent, of the total volume of reactor 1. A suitable insulating means 15, which is impervious to the reactant mixture, surrounds the jacket 7.

One end 6 of the tube 5 is open while its other end is closed by a temperature-actuated discharge valve 17. The position (relative opening) of this valve is caused to be regulated by temperature controller 43 (hereinafter described) in order to discharge reactant mixture contained in tube 5, which has been autothermically heated by the polymerization reaction, at a rate corresponding to the rate of polymerization heat evolution so that, at least in the early part of the reaction period, the temperature in the tube reaches and maintains but does not substantially exceed temperature controller 43 set point (predetermined value). This valve means 17 thereby cooperates in a novel manner with the draft tube 5 in relation to the rate of initiation of the reactants contained in the draft tube and the consequent generation of heat manifested by adiabatic rise of the temperature of the reactant mixture.

Monomer feed is introduced through line 38, solvent is introduced through line 39, and the catalyst is introduced into the bottom of the draft tube 5 through line 41. At the conclusion of the batch polymerization reaction product is withdrawn from the reactor through line 49.

At the start of any batch polymerization, valve 11 is in its wide open position and valve 17 is in its closed position. The temperature measurement signal emitted by a sensing element 45, positioned in tube 5 and operatively connected to a temperature controller 43, is below a set point (S.P.) which is preset at a desired temperature value according to the characteristics desired in the product of the particular polymerization reaction. The controller 43 is a conventional product of a number of instrument manufacturers such as The Foxboro Company of Foxboro, Mass., whose Model 58 controller such as described in Bulletin 17–169, August 1953, of The Foxboro Company is an example thereof.

As the temperature inside the tube 5 increases, the controller 43 in response to a temperature measurement signal from sensing element 45 provides an output signal which is related to the deviation of the measured temperature from the set point. This output signal gradually increases and closes valve 11 as the measured temperature approaches the set point value due to the heat input from the condensing steam and/or from the exothermic reaction heat. At the mid signal produced by the controller 43 both the valves 17 and 11 are closed. At the maximum signal produced by controller 43, valve 17 is wide open and valve 11 remains closed. As the temperature rises above the set point due to increasing liberation of reaction heat, the signal produced by controller 43 causes the diaphragm in valve operator 47 to move gradually downward causing the valve 17 to be gradually opened thereby permitting the contents of tube 5 to pass into the annular space 8 which contains the bulk of the reactant mixture. The active polymerizing molecules "seed" or initiate reaction in the bulk thus causing wide spread reaction within the reactor. As the reaction temperature 45 rises, valve 17 opens wide allowing free circulation of reactor contents throughout the vessel.

The reaction mixture in the draft tube 5 is caused to move downwardly within the draft tube by means of an auger 19 carried by a shaft 21 mounted for rotation in bearing 23. A collar 25 is fixed to the shaft 21 for rotation therewith and carries two arms 27 extending at right angles to the shaft 21. At their ends remote from the shaft 21 each of the arms 27 has secured thereto an arm 29 extending downwardly into an annular space 8 defined by the outer wall 15 of insulated jacket 7 of draft tube 5, and the inner side wall of the casing 3. A vertical mixing ribbon 31 is secured to each of the arms 29 by welding or the like. It will be understood that any suitable means for securing the ribbon to the arms 29 can be employed. This particular assembly permits the reaction mixture to be circulated downwardly through the interior of the draft tube 5 and upwardly through the annular reaction volume 8. Since the only heat supplied to this system is to the draft tube 5 which is insulated from the volume 8, this circulation of the reaction mixture, once initiated, serves not only to keep the contents of the reactor 1 well mixed but also to promote heat transfer between the small fraction of the highly-reacting reaction mixture in the draft tube and the lesser-reacting bulk of the reaction mixture in the annular volume 8.

With the aid of apparatus of the type described, it has been found possible to conduct batch polymerizations of olefin monomers at much higher viscosities, at lower (averaged) initiation temperatures, and with a reaction mixture having a lower solvent-to-monomer ratio than was possible using the conventional apparatus heretofore known.

This apparatus is generally applicable to the solution polymerization and copolymerization of olefin monomers. General reference herein to polymers is intended to cover both homopolymers and copolymers. The nature of the monomer, the catalyst or the solvent is not a critical feature of the invention. Solution polymerization of olefin monomers, especially ethylene, is now well known. Various olefins such as ethylene, propylene, butylene, butadiene, isoprene, styrene and the like can be polymerized at relatively low pressures and temperatures to produce high molecular weight polymers and copolymers using a process involving an organolithium initiator. This process is usually carried out in the presence of an organic solvent such as butane, pentane, hexane, cyclohexane, butenes, pentenes, benzene, toluene, chlorobenzene, and the like, at temperatures between about 50° F. and 240° F.

In order to illustrate the operation of my invention to show the new and unexpected advantages which are derived therefrom and to demonstrate the dimensional relationship between the various components of reactor 1, one embodiment of such a reactor had the following dimensions:

DRAFT TUBE 5

Inside diameter—21 inches.
Length—100 inches.
Volume inside of draft tube—150 gallons.

AUGER 19

Diameter—20 inches.
Height—99 inches.
Pitch—8½ inches.

CASING 3

Inside diameter—72 inches.
Height (head-to-head)—192 inches.
Scraped height—172 inches.
Contains a mixing ribbon on a 40-inch pitch.

Total liquid volume (less draft tube, valve, auger, ribbon, etc.) is 3000 gallons. Approximately 5 percent of this volume or 150 U.S. gallons is held within the draft tube.

With the aid of apparatus of the type shown in the drawing, it has been found possible to conduct polymerization of olefin monomers at much higher viscosities (and therefore higher polymer concentrations) and with much lower average initiation temperatures than was feasible when operating with a reactor provided only with cooled surfaces and means for agitating the contents of the reactor with a means such as the auger 19 or a propeller or turbine type agitator.

In this example, a mixture of 1,3-butadiene and styrene feed in a 75/25 weight ratio of butadiene to styrene is introduced into the reactor 1 through the line 38. N-hexane is introduced into the reactor through line 39 in a quantity sufficient to yield a solvent-to-monomer weight ratio of 510/100. These feed materials are at a temperature below 100° F. when charged to reactor 1.

Butyllithium is then introduced into the bottom of tube 5 through line 41 in sufficient quantity to give a solvent-monomer-catalyst weight ratio of 510/100/0.85.

The valve 17 at the start of the operation is in the closed position. The valve 17 is opened and the reaction mixture consisting of the monomer, catalyst, and solvent is stirred by rotating the shaft 21 at a speed of 30 r.p.m., which gives a turnover time of the entire reactant contents on the order of 1–3 minutes. The valve 17 is then closed whereby approximately 150 gallons of the reaction mixture are isolated from the remainder of the feed mixture. Mixing is continued and steam is supplied to the heating jacket 7 in order to raise the temperature of the reactant mixture contained in tube 5 to 160° F. whereupon polymerization therein is initiated. The sensing element 45 transmits a temperature measurement signal to controller 43. As the temperature inside tube 5 approaches 160° F. then this controller produces a signal which causes steam flow valve 11 to gradually close and which then causes diaphragm 47 to gradually open valve 17. The opening of valve 17 permits that part of the reaction mixture in tube 5 to pass into the annular space 8 which holds the bulk of the reactant mixture. The closing of valve 11 stops the flow of steam into the annular heating space 10 via line 9. This control system is adjusted so that at a temperature of 160° F. inside the tube 5, the valve 11 will be completely closed and the valve 17 will be starting to open. Obviously one skilled in the art could, by calibration of the valves and of the controller, provide overlapping of the closing of valve 11 with the initial opening of valve 17–47. Similarly, a dead zone could be imposed whereby valve 11 would be fully closed, e.g., 155° F. with valve 17–47 beginning to open at 180° F.

The rate of heating of the relatively cold reaction mixture contained in tube 5 to a temperature where initiation of the polymerization reaction takes place is dependent upon physical parameters such as the volume of the initiator section, the heating surface provided by tube 5, the steam pressure (and temperature) within space 10 and the degree of agitation provided by auger 19. Such a rate of temperature rise can be in the range of 1 to 10° F. per minute, preferably about 5° F. per minute.

Similarly, the rate of temperature rise of the reactor contents upon initiation of polymerization by the small reacting volume is dependent upon the volume ratio and upon the activity of the catalyst, concentrations of reaction poisons, etc. In most cases, the temperature increases slowly (at a rate of 0.1 to 2.0 degrees per minute) for a few minutes, then accelerates rapidly to a rate in the range of 1 to 10 degrees per minute thereafter decreasing gradually to a rate of 0.1 to 2.0 degrees per minute as the reactant(s) is depleted and heat losses from the reactor to its surroundings becomes large due to the elevated temperature, e.g., about 200° F. Because of this non-linear adiabatic temperature rise behavior, monomer conversions of 98 percent and above are infrequently accomplished since the reaction time required becomes excessive. Generally, economical practice in polymer manufacturing plants dictates carrying reactions of this character to 98 percent or less of completion, often in the range of 80 to 98 percent.

The controller 43, in response to a temperature measurement signal from sensing element 45 provided an output signal related to the deviation of the measured temperature from the set point (S.P.) In this experiment the desired temperature was set at 160° F.

The mixture initiated as hereinabove described produces a seeding effect in the bulk of the reactant mixture and initiates the polymerization of the remainder of the feed mixture at or slightly above the charge temperature of the charge mixture. Because of this low initiation temperature and because of the relatively low solvent-to-monomer ratio, the temperature of the reaction mixture does not rise above 240° F. It is, therefore, unnecessary to provide a venting or any type of cooling of the reactants and it is possible to employ a high monomer concentration without exceeding a desired peak temperature. This permits polymer to be produced at a rate of 1500 pounds per hour with about 90 percent conversion of the butadiene-styrene feed.

The polymer solution is removed from the reactor through line 49 after approximately 1½ to 2 hours residence time. The polymer contained therein possesses a Mooney viscosity of about 49–50. The solids concentration in the reaction mixture withdrawn from the reactor is 17.7 percent.

In another embodiment, the valve 17 at the start of the operation is in the open position. Monomer and solvent are added to the reactor and stirred by rotating the shaft 21. Valve 17 is then closed to isolate approximately 150 gallons of the monomer and solvent mixture. Catalyst is then introduced into the bottom of tube 5 and auger 19 is rotated on shaft 21 to circulate the catalyst within the tube 5. As described hereinabove, steam is supplied to the jacket 7 in order to raise the temperature of the mixture contained in tube 5 to 160° F. By confining the catalyst to the area inside of the tube, substantially all of the catalyst will be initiated when the valve 17 begins to open.

This superiority of the method of the invention over methods utilizing a conventional reactor can be compared by using the same polymerization system. In a conventional reactor. solvent-to-monomer weight ratio in a styrene-butadiene in n-hexane system was in the neighborhood of 1050–100. The weight ratio of solvent to monomer to catalyst was 1050/100/0.85. The ratio of the catalyst was the same. Polymer was produced in this reactor at the rate of 800 pounds per hour with about 90 percent conversion of the feed with a residence time in the reactor of 1½–2 hours. The solids concentration in the reaction mixture in this polymerization process withdrawn from the reactor was 8.6 percent. The maximum reaction temperature was 240° F. in this system also. The initiation temperature (of the entire reactor contents) was 160° F. It can be readily observed that the conventional methods require a higher solvent-to-monomer ratio, produce less polymers per hour.

It is also within the scope of my novel process in those cases where particularly great difficulty is encountered in maintaining the reaction mixture below a desired peak temperature to either precool the reaction mixture before it is introduced into the reactor or precool the individual reactants before they are mixed therein. However, I have discovered that precooling the bulk of the reactants below 50° F. would decrease the activity of the butyl-lithium catalyst to such an extent that the seeding effect of the preinitiated small fraction of the total volume of reactants charged would fail to cause an initiation of the entire mass.

The invention has been described with particular reference to the production of a copolymer of styrene and 1,3-butadiene but is equally applicable to the production of any other polymer by a batch solution polymerization process resulting in a viscous solution of the polymer. The upper limit of viscosity at which the method of the invention can be economically practiced is dictated not by the extent to which heat transfer from the reaction mixture is feasible, but rather by practical limitations such as the power required for effecting movement of the auger and ribbon elements.

Obviously many modifications and variations of the present invention are possible in the light of the above teachings. It is, therefore, to be understood that within the scope of the appended claims the invention may be practiced otherwise than as specifically described herein.

I claim:

1. An adiabatic batch polymerization reactor comprising a hollow casing having a reaction zone therein; closure means located within said reaction zone for enclosing a portion of the reaction zone, said closure means being open at the top thereof; temperature measuring means located in the closure means and being operatively responsive to changes of temperature therein; heating means positioned around the closure means for raising the temperature of that portion of the reaction zone located within the closure means; valve means located in the bottom of the closure means; controlling means being operatively responsive to said temperature means for gradually opening said valve means and for gradually shutting off said heating means in response to the temperature inside the closure means.

2. A reactor according to claim 1 further including agitation means for circulating a reaction mixture through the reaction zone and down through the closure means.

3. An adiabatic batch polymerization reactor comprising a closed, vertically-disposed hollow cylindrical casing having a reaction zone therein; a hollow draft tube located within said reaction zone and enclosing about 2 to 10 percent of the volume of the reaction zone, said draft tube being open at the top thereof; a valve means located in the bottom of the draft tube; a heating jacket surrounding said draft tube for receiving heat transfer fluid; insulation means located on the outside of said heating jacket; a temperature-sensing means positioned within said draft tube; controlling means operatively responsive to said temperature-sensing means for gradually opening said valve means and for shutting off the heat transfer fluid entering the heating jacket; a plurality of mixing means rotatably mounted in one end of the casing and extending along each side of the casing and in the draft tube substantially the full length thereof.

References Cited
UNITED STATES PATENTS

| | | | |
|---|---|---|---|
| 2,472,377 | 6/1949 | Keith | 23—288.35X |
| 2,488,406 | 11/1949 | Hirsch | 23—288.35X |
| 2,557,842 | 6/1951 | Ruthruff | 23—288.35X |
| 3,074,924 | 1/1963 | Kizer et al. | 260—95 |
| 3,206,287 | 9/1965 | Crawford | 23—285 |

JAMES T. TAYMAN, JR., Primary Examiner

U.S. Cl. X.R.

23—252, 253; 137—90; 165—39, 108, 109; 259—97; 260—95